March 1, 1949. E. P. SAUERBORN 2,462,906
MANUFACTURE OF METAL CONTACT RECTIFIERS
Filed April 29, 1944

INVENTOR.
EUGENE P. SAUERBORN
BY
ATTORNEY

UNITED STATES PATENT OFFICE 2,462,906

MANUFACTURE OF METAL CONTACT RECTIFIERS

Eugene P. Sauerborn, Newark, N. J., assignor to Federal Telephone and Radio Corporation, New York, N. Y., a corporation of Delaware Application April 29, 1944, Serial No. 533,426

2 Claims. (Cl. 175—366)

This invention relates to the manufacture of metal contact rectifiers, also known as dry rectifiers, which comprise two flat electrodes separated by a semi-conducting layer. The invention is particularly directed to a novel method of manufacturing such rectifier discs and a novel disc construction produced thereby.

Rectifier discs of this type are ordinarily made by punching out a rigid base plate from a sheet of a suitable conducting metal, forming or applying the layer of semi-conducting material to a surface of the base plate, and applying a counter-electrode to the outer surface of the semi-conducting layer. In selenium rectifiers, to which the invention is especially applicable, the base plate is punched out from a metal such as steel or aluminum, its surface roughened as by sandblasting, a thin plating of a metal such as nickel is applied to the roughened surface, a thin layer of selenium in its vitreous or amorphous form is fused to the plate surface, and a counter-electrode layer of conducting metal is applied to the selenium. The selenium may be applied by melting it on a heated plate, by fuming or sputtering it onto the plate, or by applying it as powder. Where the selenium is applied in the form of a powder, the powder is subjected to heat and pressure, during which it is fused to the base plate and the nuclei of selenium crystals are formed. This is known as the first heat treatment. Thereafter the selenium layer is converted by a second heat treatment into the crystalline form which is substantially conductive and is suitable for rectifier use.

The general objects of the invention include the provision of a method of making a rectifier disc of the indicated type which eliminates the need for many operations heretofore required, such as punching, roughening, plating and the like, while producing a rectifier disc having satisfactory characteristics, suitable for use in the same manner as rectifier discs made by previous methods. These objects are in general accomplished by making the rectifier disc in whole or in part by molding powdered metallic materials under heat and pressure, thereby consolidating the powder, and particularly the base plate powder, and eliminating the necessity for using the metal in sheet, molten or fume form.

For this purpose powdered base plate metal is placed in a mold and subjected to pressure sufficient to form a coherent base plate. The semi-conducting layer is applied in powder form, and is likewise consolidated by compression. However, it has been found that satisfactory base plates cannot be formed by pressure alone. The pressed powder disc is therefore subjected to a temperature sufficient to sinter the base plate powder, thereby forming a disc which has sufficient strength and rigidity for use in standard units. The counter-electrode metal is applied, either by spraying in molten condition or otherwise in accordance with common practice or by applying a layer of suitable powdered metal which is compressed against the semi-conductor to consolidate the counter-electrode and provide the necessary intimate contact.

The invention is especially applicable to the manufacture of rectifier discs in which the semi-conducting layer consists essentially of selenium. A feature of this invention is the combination of the method of making base plates by the compression and fusing of metal powder with the procedure for manufacturing selenium discs by the pressed selenium powder method so as to produce a simplified method of manufacturing efficient selenium rectifier discs.

For this purpose the heat and pressure employed in applying the selenium powder to the base plate may be utilized to consolidate the base plate powder, either after the initial compressing of the latter or without employing such initial compression; and it has been found that only a relatively brief period of treatment under appropriate heat and pressure is necessary to form the initially consolidated discs composed of the base plate and the selenium layer, with the latter containing the requisite crystalline nuclei.

When the discs thus produced is subjected to the second heat treatment, which is carried out at much higher temperature, the base plate is simultaneously sintered. This is accomplished by employing as the base plate material a powder made up of combinations of metals or an alloy or alloys which have the necessary properties of good conductivity, adhesion to the semi-conductor and freedom from injurious action on the latter, a danger that is especially serious where selenium is employed. It has been determined that by selecting combinations of metals which include one or more having a melting point too high to sinter below the melting point of selenium, together with one or more having a very much lower melting point and which will readily sinter below said temperature, a strong base plate can be produced by sintering.

The metals which have been found suitable for use, and especially advantageous where selenium semi-conducting layers are employed, are bismuth, cadmium, tin, nickel, aluminum, iron (pure), chromium, magnesium, platinum, silver, zinc, palladium and antimony. Examples of suitable base plate alloys for use with selenium rectifier discs are, first, a composition of 61 per cent tin and 39 per cent cadmium, and second, a composition of 89 per cent tin and 11 per cent antimony, each of which compositions will have a sintering temperature around 216° C.

The counter-electrode may be applied after the second heat treatment in the usual manner, as by spraying Wood's metal on the selenium surface. However, the counter-electrode may also be provided by applying a suitable metal powder to the selenium layer and subjecting this powder to heat and pressure. When made in this manner the counter-electrode should be a metal combination or alloy which will sinter at the temperature used in second heat treatment, and may be an alloy of the type described above as suitable for use in the base. For instance, the above mentioned alloy of 61 per cent tin and 39 per cent cadmium may be used.

The screen analysis of the powdered metal is not critical, though the use of properly sized powder is advantageous. The base plate metal should not be coarser than 60 mesh and sizes as fine as 300 mesh may be employed, though ordinarily powders largely in the range of from 80 to 200 mesh are satisfactory. The same sizes are appropriate for the semi-conductor and the counter-electrode. For convenience all finely divided material mentioned herein will be referred to as powder.

While it is generally desirable to combine the application of pressure and heat in one operation, these steps may be carried out consecutively if desired, it being necessary however to apply sufficient pressure to consolidate the metal and permit handling where the heat treatment is a separate step.

The invention is diagrammatically illustrated in the accompanying drawings, in which, Fig. 1 is a diagrammatic central sectional view through a mold with the base plate powder in position for compression;

Figure 1:
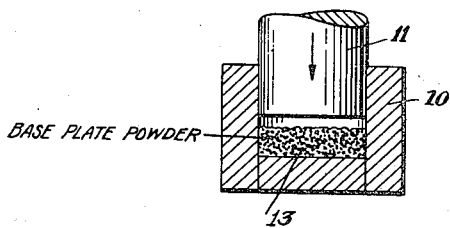

The pressure mold indicated diagrammatically comprises a body 10, a plunger 11, and a heating unit 12. In the process illustrated in Figs. 1 and 2 the base plate powder 13 is subjected to an initial compression in the mold sufficient to consolidate it and to provide a uniform level upper surface before the application of the semi-conductor powder 14. A pressure of thirty tons per square inch has been found to be satisfactory. After the semi-conductor powder 14 is spread over said surface, pressure and heat are applied until the semi-conductor powder is not only consolidated but also includes the desired nuclei of the crystalline form, as in the usual first heat treatment. It has been found that these steps are effective when the pressure used in Fig. 1 is approximately 30 tons per square inch. The heat during compression of the layers shown in Fig. 2 should be substantially between 100° C. and 140° C.; and only two minutes are required to obtain the desired results when the layers are under a pressure of about 2500 pounds per square inch.

Figure 2:
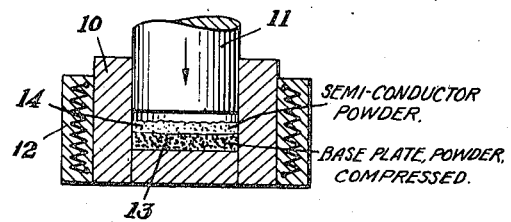
Fig. 2 is a similar view showing the base plate powder compressed and the semi-conductor powder in position for compression, the mold being provided with a heating element.
Figure 3:
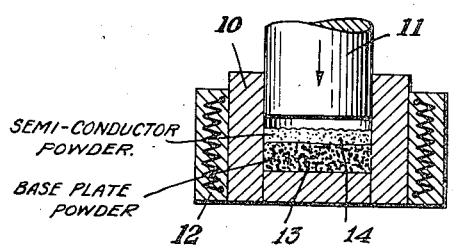
Fig. 3 is a similar view with the base plate and semi-conductor materials both introduced in powder form prior to pressing.
Figure 5:
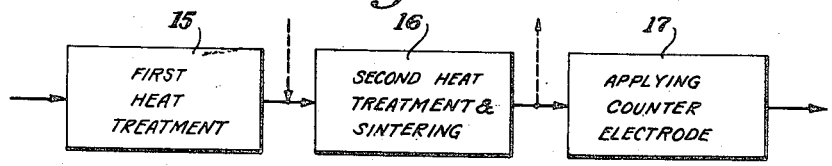
Fig. 5 is a flow sheet indicating successive operations.
Figure 6:
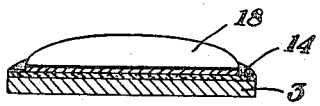
Fig. 6 is a view of a disc produced by a method employing this invention, shown in central section with the rear half in perspective, the margin of the counter-electrode being inwardly spaced from the outer edge of the selenium.

This procedure may be varied, as by providing a separate first heat treatment step 15, indicated in Fig. 5, for the base plate and selenium compressed as in Fig. 2 under a pressure of about 30 tons per square inch, in which case about four or five hours are necessary at the temperatures indicated. Moreover, both the base plate and the semi-conductor may be pressed simultaneously without preliminary pressing of the base plate powder, as indicated in Fig. 3, the effective pressure being in the neighborhood of 30 tons per square inch. In this instance also the materials may be subjected to the first heat treatment while under pressure in the mold and will require about two minutes of heat treatment, or the discs may be removed from the mold, jigged and placed in the first heat treatment oven 15 for separate first heat treatment as already indicated.

After the consolidation of the powder by pressure and the application of the first heat treatment the discs are subjected to a second heat treatment and sintering step 16, which may follow well established procedure in making selenium rectifier discs, though here it performs an additional function. For this purpose they are subjected to a temperature just below the melting point of selenium, which is approximately 217° C., for a period sufficient to complete the conversion of the selenium to the gray crystalline metallic form suitable for rectifier operation. This ordinarily will require about fifteen minutes to one hour. During this step the base plate metal is sintered.

Under ordinarily conditions the sintering operation will be carried out in the air; but when substantially greater strength is desired in the base plate, the sintering operation may be carried out in an atmosphere that is inert, or which at least has no detrimental action on the rectifier materials. Specifically, the sintering operation may be conducted in an atmosphere of carbon dioxide, nitrogen, hydrogen, or suitable mixtures of any of these gases.

Figure 4:
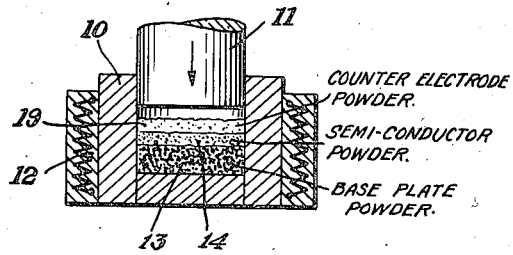
Fig. 4 is a similar view with the base plate, semi-conductor and counter-electrode materials all introduced in powder form before pressing.

The usual counter-electrode may then be applied in the ordinary manner at 17, as already indicated, the standard procedure being to spray a layer 18 of Wood's metal on the selenium surface, the outer margin of which is masked to avoid short circuits. The counter-electrode may also be applied in the form of a layer of powder 19 spread over the surface of the semi-conductor layer, as illustrated in Fig. 4, though it will be understood that either the base plate or the base plate and semi-conductor powder may have been subjected previously to pressure with or without the application of heat for the first heat treatment. In this form of the invention, however, it is necessary to use for the counter-electrode a metal having the requisite physical and chemical characteristics which will not melt at the second heat treatment temperature. For this purpose alloys which have been indicated above as suitable for use in forming the base plate may be employed, and particularly alloys containing cadmium, the alloy of 61 per cent tine and 39 per cent cadmium being suitable.

The coalescence of the powdered particles to each other to form layers having the requisite rigidity, conductivity and intimate contact has been referred to herein as sintering and is believed in general to come within the scope of this phenomenon as ordinarily defined. However, it may be practicable under proper conditions to provide metals or alloys for the base plate or counter-electrode which will fuse at the indicated temperatures to an extent which may not come within the scope of ordinary sintering but without producing excessive softening. It is to be understood that the references to sintering are intended to include this phenomenon, though in the specific embodiments described, technical sintering has been found to be especially advantageous.

While various methods and alternatives have been suggested, it should be understood that other modifications and combinations of the various steps may be employed. It is also understood that other operations which are well known in the preparation of rectifier discs will be carried out in the usual manner, the electro-forming operation being an example.

What is claimed is:

1. A method of manufacturing rectifier discs which comprises placing in a mold a layer of base plate metal powder consisting of an alloy of approximately 61% tin and approximately 39% cadmium, distributing a layer of vitreous selenium powder on the base plate powder, consolidating said powders by pressure to form a coherent disc having a base plate layer and a semi-conducting layer and converting said selenium layer by heat into the crystalline gray conducting form simultaneously with the sintering of the base plate.

2. A method of manufacturing rectifier discs which comprises placing in a mold a layer of a base plate metal powder consisting of an alloy of approximately 61% tin and approximately 39% cadmium, distributing a layer of vitreous selenium powder on the base plate powder, spreading on the selenium powder a layer of counter-electrode metal powder consisting of approximately 61% tin and approximately 39% cadmium, consolidating said powders by pressure to form a coherent disc having a base plate, a semi-conducting layer and a counter-electrode layer and sintering the base plate layer and the counter-electrode layer while applying a pressure of approximately 30 tons per square inch.

EUGENE P. SAUERBORN.

REFERENCES CITED

The following references are of record in the file of this patent:

UNITED STATES PATENTS

| Number | Name | Date |
|---|---|---|
| 1,678,826 | Ruben | July 31, 1928 |
| 1,826,955 | Ruben | Oct. 13, 1931 |
| 1,896,853 | Taylor | Feb. 7, 1933 |
| 2,175,016 | Brunke | Oct. 3, 1939 |
| 2,267,954 | Schumacher | Dec. 30, 1941 |
| 2,325,071 | Murray | July 27, 1943 |
| 2,342,278 | Herrmann | Feb. 22, 1944 |

FOREIGN PATENTS

| Number | Country | Date |
|---|---|---|
| 516,137 | Great Britain | Dec. 22, 1939 |